United States Patent
Kellogg et al.

(10) Patent No.: US 10,282,913 B2
(45) Date of Patent: May 7, 2019

(54) MARKERLESS AUGMENTED REALITY (AR) SYSTEM

(71) Applicant: Visom Technology, Inc., Woodinville, WA (US)

(72) Inventors: Ryan Kellogg, Woodinville, WA (US); Charles Phillips, Woodinville, WA (US); Sean Buchanan, Woodinville, WA (US)

(73) Assignee: Visom Technology, Inc., Woodinville, WA (US)

( * ) Notice: Subject to any disclaimer, the term of this patent is extended or adjusted under 35 U.S.C. 154(b) by 0 days.

(21) Appl. No.: 15/658,310

(22) Filed: Jul. 24, 2017

(65) Prior Publication Data
US 2019/0026948 A1 Jan. 24, 2019

(51) Int. Cl.
G06T 19/00 (2011.01)
G02B 27/01 (2006.01)
G06T 7/246 (2017.01)
G06T 7/73 (2017.01)

(52) U.S. Cl.
CPC ........ *G06T 19/006* (2013.01); *G02B 27/0172* (2013.01); *G06T 7/246* (2017.01); *G06T 7/73* (2017.01); *G02B 2027/014* (2013.01); *G02B 2027/0138* (2013.01); *G02B 2027/0187* (2013.01); *G06T 2207/10016* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 4,722,056 A | 1/1988 | Roberts et al. |
| 5,383,454 A | 1/1995 | Bucholz |
| 5,389,101 A | 2/1995 | Heilbrun et al. |
| 5,603,318 A | 2/1997 | Heilbrun et al. |
| 7,616,807 B2 | 11/2009 | Zhang et al. |
| 8,311,611 B2 | 11/2012 | Csavoy et al. |
| 8,781,162 B2 | 7/2014 | Zhu et al. |
| 8,791,960 B2 | 7/2014 | Yoon et al. |
| 2005/0004449 A1 | 1/2005 | Mitschke et al. |

(Continued)

FOREIGN PATENT DOCUMENTS

| | | |
|---|---|---|
| DE | 10210287 A1 | 10/2003 |
| DE | 10322739 A1 | 12/2004 |
| EP | 2674913 B1 | 7/2014 |

OTHER PUBLICATIONS

Clarke, "Markerless Augmented Reality for visualizering av 3d object in real world", published in Jun. 11, 2014 (Year: 2014).*

(Continued)

*Primary Examiner* — Yingchun He
(74) *Attorney, Agent, or Firm* — Fenwick & West LLP

(57) ABSTRACT

A markerless augmented reality (AR) can track 2D feature points among video frames, generate 2D point clouds and 3D point clouds based thereon, and match a 3D model against 3D point cloud to obtain proper positional information of the model with respect to a frame. The AR system can use the 3D model with the obtained positional information to render and project AR content to a user's view. Additionally, the AR system can maintain associations between frames and 3D model positional information for search and retrieval.

20 Claims, 8 Drawing Sheets

(56) References Cited

U.S. PATENT DOCUMENTS

| | | | |
|---|---|---|---|
| 2005/0200624 | A1 | 9/2005 | Lachner et al. |
| 2007/0103460 | A1* | 5/2007 | Zhang .................... G06T 7/246 345/419 |
| 2008/0137940 | A1 | 6/2008 | Kakinami et al. |
| 2010/0250185 | A1* | 9/2010 | Marshall ................. G01V 7/00 702/152 |
| 2011/0090252 | A1 | 4/2011 | Yoon et al. |
| 2013/0335529 | A1 | 12/2013 | Engedal |
| 2014/0002495 | A1 | 1/2014 | Lamb et al. |
| 2014/0055342 | A1 | 2/2014 | Kamimura et al. |
| 2015/0130740 | A1 | 5/2015 | Cederlund et al. |
| 2015/0145959 | A1 | 5/2015 | Tang et al. |
| 2015/0332512 | A1 | 11/2015 | Siddiqui et al. |
| 2016/0253805 | A1 | 9/2016 | Nachman |
| 2016/0253814 | A1* | 9/2016 | Fathi ....................... G06T 7/579 382/154 |
| 2017/0124713 | A1 | 5/2017 | Jurgenson et al. |
| 2017/0148167 | A1 | 5/2017 | Aratani |
| 2017/0193331 | A1 | 7/2017 | La Fleur et al. |
| 2018/0005015 | A1 | 1/2018 | Hou et al. |

OTHER PUBLICATIONS

OpenCV: Image manipulation, feature detection and description, http://docs.opencv.org/3.1.0/d5/d51/group_features2d_main.html; accessed Aug. 22, 2017; 4 pages.

Ceres-Solver: Least Squares solver, designed in part for SLAM algorithm usage, particularly for the pose graph and bundle adjustment of the map/graph, http://ceres-solver.org/nnls_solving.html; accessed Aug. 22, 2017; 45 pages.

Ceres-Solver: Least Squares solver, designed in part for SLAM algorithm usage, particularly for the pose graph and bundle adjustment of the map/graph, https://github.com/ceres-solver/ceres-solver/tree/master/examples/slam/pose_graph_3d; accessed Aug. 22, 2017; 2 pages.

Ceres-Solver: Least Squares solver, designed in part for SLAM algorithm usage, particularly for the pose graph and bundle adjustment of the map/graph, http://ceres-solver.org/nnls_tutorial.html#bundle-adjustment; accessed Aug. 22, 2017; 3 pages.

Suitesparse: Ceres dependency for sparse matrix solving; http://faculty.cse.tamu.edu/davis/suitesparse.html; accessed Aug. 22, 2017; 3 pages.

Microsoft Windows-universal-samples: DirectX helper libraries for image parsing and display; https://github.com/Microsoft/Windows-universal-samples; accessed Aug. 22, 2017; 7 pages.

Klein, G. et al., "Parallel Tracking and Mapping for Small AR Workspaces," IEEE, 2007, ten pages.

PCT International Search Report and Written Opinion, PCT Application No. PCT/US18/43164, dated Nov. 26, 2018, 11 pages.

Sanjuan, D. et al., "Online Registration Tool and Markerless Tracking for Augmented Reality," Proceedings of WIAMIS, Apr. 2005, four pages.

* cited by examiner

MARKERLESS AUGMENTED REALITY (AR) SYSTEM

BACKGROUND

Augmented reality (AR) generally refers to a live, direct or indirect, view of a physical, real-world environment whose elements are augmented by computer-generated sensory input such as video, graphics, sound, or GPS data. AR devices, such as AR Head-Mounted Display (HMD) devices, may include transparent display elements that enable a user to see virtual content superimposed (e.g., overlaid or projected) over the user's view of the real world. Virtual content that appears to be superimposed over the user's real-world view is commonly referred to as AR content, which may include "holographic" objects as well as other sensory information or data.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
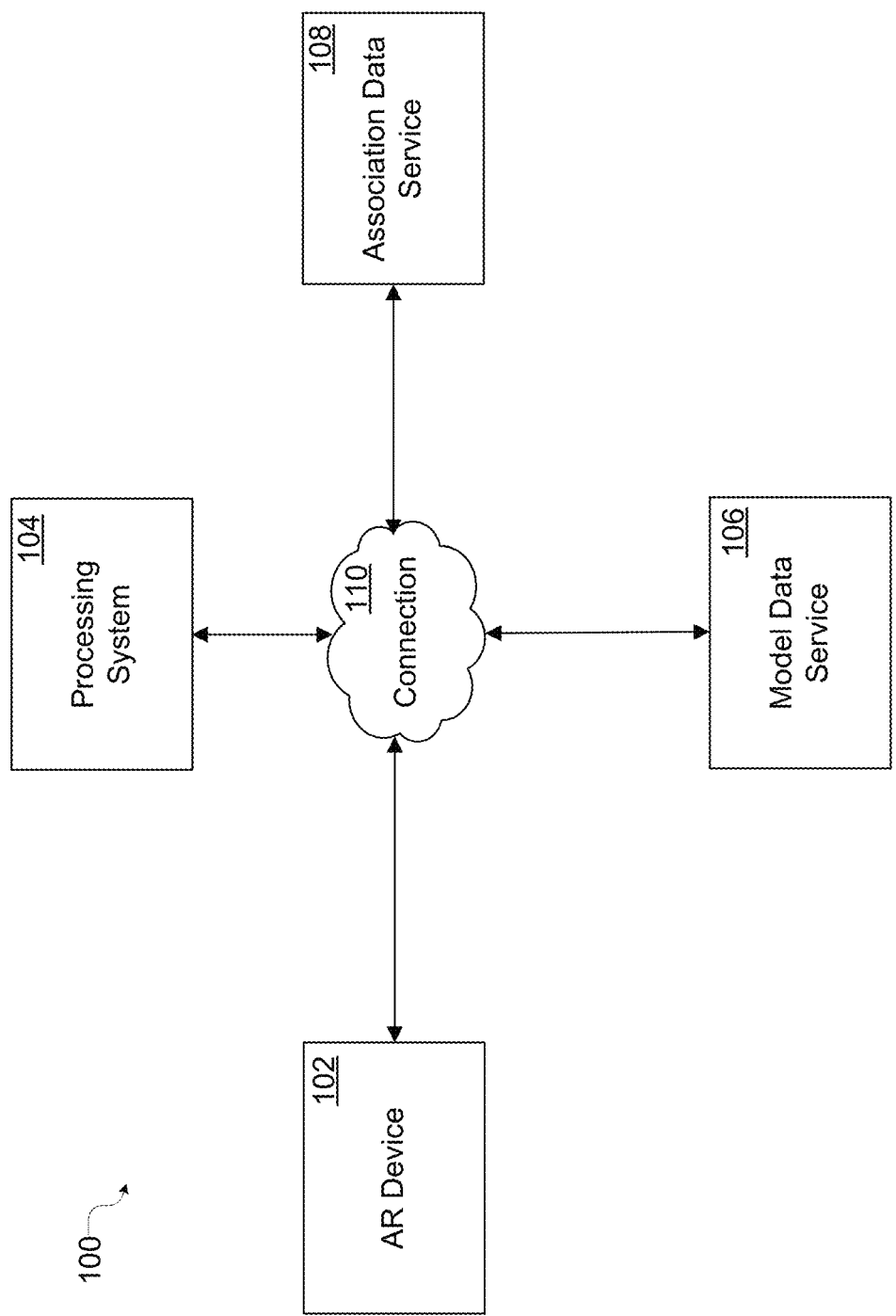
FIG. 1 illustrates an example of an AR system in accordance with some embodiments of the presently disclosed technology.

In order to accurately and promptly superimpose AR content in various contexts (e.g., navigation, gaming, education, entertainment), 3D positional information (e.g., location and orientation in a world coordinate system) of a camera that acquires image or video (e.g., multiple frames of images) is typically required in an accurate and real-time manner. In this regard, marker-based AR relies on the presence of artificial markers in the user's view. These markers, however, may distract from a view of the subject of interest, contribute to certain unnatural feel of the AR experience, or otherwise adversely affect user experience. Also, marker-based AR can simply be inapplicable in many cases because the artificial markers cannot be added to certain real-world scenes.

The presently disclosed technology is directed to markerless AR systems and methods that enable efficient tracking of feature points among images (e.g., consecutive frames within a video) of natural and/or never-before-seen surroundings, 3D model matching based on the tracked feature points, and AR content rendering using positional information of the matched 3D model. In contrast with typical AR systems or methods that optimize for the global accuracy of a map of surrounding environment or a pose of the camera, the presently disclosed technology focuses on the local accuracy of feature points relative to the camera in order to accurately align virtual and real objects for AR. Accordingly, the presently disclosed technology can be computationally more efficient for implementation in real-time with relatively limited computational resources (e.g., on a CPU of a mobile device such as an AR-HMD or smartphone).

FIGS. 1-8 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding AR device. For example, the programmable computer or controller can be an onboard computer of the AR device, a separate but dedicated computer associated with the AR device, or part of a network or cloud based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and mobile devices (including palm-top computers, wearable computing devices, cellular or mobile phones, multi-processor systems, processor-based or programmable consumer electronics, network computers, mini computers and the like). Information handled by these computers and controllers can be presented at any suitable display medium, including an LCD (liquid crystal display) or AR-HMD's transparent display. Instructions for performing computer- or controller-executable tasks can be stored in or on any suitable computer-readable medium, including hardware, firmware or a combination of hardware and firmware. Instructions can be contained hi any suitable memory device, including, for example, a flash drive, USB (universal serial bus) device, and/or other suitable medium.

FIG. 1 illustrates an example of an AR system 100 in accordance with some embodiments of the presently disclosed technology. The AR system 100 can include an AR device 102, a processing system 104, a model data service 106, and an association data service 108 that are communicatively connected with one another via connections 110.

The AR device 102 can be an AR-HMD, smartphone, or other mobile device that can implement at least some portion of the technology disclosed herein. The AR device 102 can include a head fitting, by which the AR device 102 can be worn on a user's head. The AR device can include one or more transparent AR display devices, each of which can overlay or project holographic images on the user's view of his or her real-world environment, for one or both eyes (e.g., by projecting light into the user's eyes). The AR device 102 can further include one or more eye-tracking cameras for gaze capturing, one or more microphones for voice input, one or more speakers for audio output, and one or more visible-spectrum video cameras for capturing surrounding environment and/or user gestures. Those of art in the skill will understand that the AR device 102 can include other sensors that provide information about the surrounding environment and/or the AR device 102 (e.g., one or more depth sensors for determining distances to nearby objects, GPS or IMU for determining positional information of the AR device 102, or the like). The AR device 102 can also include circuitry to control at least some of the aforementioned elements and perform associated data processing functions (e.g., speech and gesture recognition and display generation). The circuitry may include, for example, one or more processors and one or more memories. Some embodiments may omit some of the aforementioned components and/or may include additional components not mentioned above.

In the illustrated example, the AR device 102 is configured to communicate with one or more other components of the AR system via one or more connections 110, which can include a wired connection, a wireless connection, or a combination thereof. In some embodiments, however, the AR device 102 can implement all the functionalities of the AR system 100 as disclosed herein and can operate as a standalone device. The connection 110 can be configured to carry any kind of data, such as image data (e.g., still images and/or full-motion video, including 2D and 3D images), audio data (including voice), multimedia, and/or any other type(s) of data. The connection 110 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), a local area network (LAN), a wide area network (WAN), an intranet, a metropolitan area network (MAN), the global Internet, or the like, or a combination thereof.

The processing system 104 can be implemented, for example, on a personal computer, game console, tablet computer, smartphone, or other type of processing device. Alternatively or in addition, the processing system 104 (or at least a portion thereof) can be implemented via a network or cloud based computing service. As discussed above, in some embodiments, the processing system 104 can be implemented, in part or in whole, by the AR device 102. The processing system 104 can receive images, video, audio, or other data collected by one or more sensors of the AR device 102, process the received data in real-time or substantially real-time (e.g., within a threshold of delay) for extracting and/or tracking feature points in 2D and/or 3D, and generating point clouds in 2D and/or 3D in accordance with some embodiments of the presently disclosed technology.

The processing system 104 can query, search, retrieve, and/or update 3D models from the model data service 106, which can be implemented, for example, on a personal computer, game console, tablet computer, smartphone, or other type of processing device. Alternatively or in addition, the model data service 106 (or at least a portion thereof) can be implemented via a network or cloud based computing service. As discussed above, in some embodiments, the model data service 106 can be implemented, in part or in whole, by the AR device 102. The model data service 106 may include one or more databases or data stores that maintain one or more 3D models of AR objects (e.g., 30 mesh models or 3D point cloud models). The processing system 104 can match a 3D model selected from the model data service 106 with 3D point cloud(s) generated based on feature points, and determine a proper position and/or orientation for the 3D model. Based on the match, the processing system 104 can render corresponding AR content, and cause the AR device 102 to overlay or otherwise superimpose the AR content on a user's view.

The processing system 104 can query, search, retrieve, and/or update associations between features of images and positions and/or orientations of 3D models that are maintained by the association data service 108. The association data service 108 can be implemented, for example, on a personal computer, game console, tablet computer, smartphone, or other type of processing device. Alternatively or in addition, the association data service 108 (or at least a portion thereof) can be implemented via a network or cloud based computing service. As discussed above, in some embodiments, the association data service 108 can be implemented, in part or in whole, by the AR device 102. In response to a match between a selected 3D model with one or more 3D point clouds generated based on feature points, the processing system 104 can associate the position and/or orientation of the matched 3D model with one or more images (e.g., video frames, or feature points derived from video frames) that provided basis for the matched 3D point cloud(s). Such associations can be transmitted to, stored, or otherwise maintained by, for example, one or more databases or data stores of the association data service 108.

In some embodiments, the processing system 104, the model data service 106, or the association data service 108 can pre-compute 3D point clouds and/or feature point patterns based on various pre-determined or predicted positions and/or orientations of a selected 3D model. The pre-computation results and their associated position and/or orientation of the 3D model can also be maintained by the association data service 108, for example, to supplement, reinforce, and/or verify other associations that have been determined based on actual image or video data received from the AR device 102.

In some embodiments, the processing system 104 can identify an applicable association from the association data service 108 for any incoming image(s), for example, based on feature point patterns derived from the incoming image. Based on the position and/or orientation of a selected 3D model as indicated by the identified association, the processing system 104 can render AR content, and cause the AR device 102 to properly overlay or otherwise superimpose the AR content on the users view.

Figure 2:
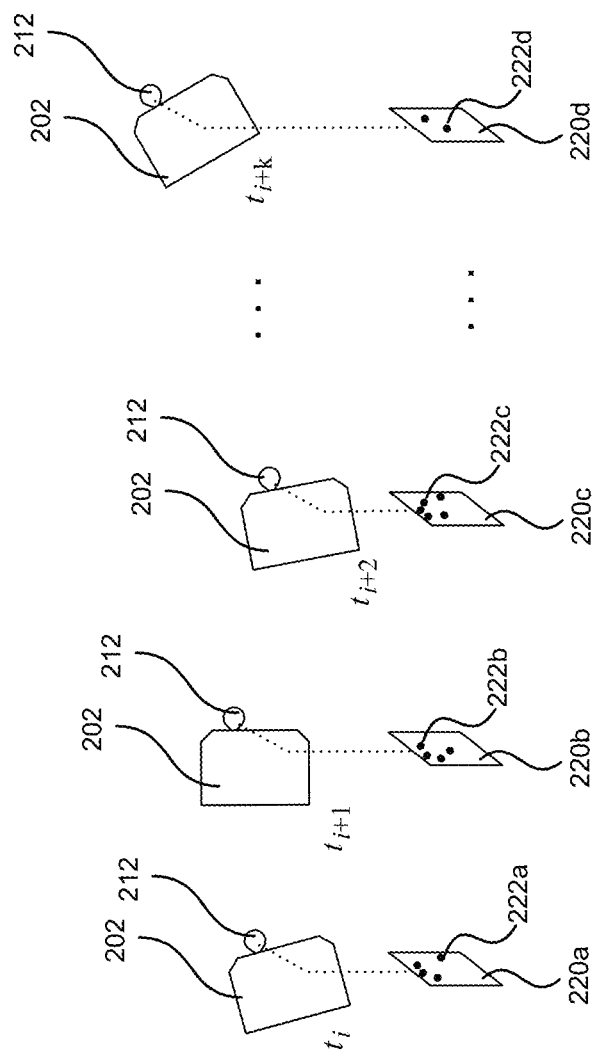
FIG. 2 illustrates an example of feature points extraction and tracking from multiple images in accordance with some embodiments of the presently disclosed technology.

FIG. 2 illustrates an example of feature points extraction and tracking from multiple images in accordance with some embodiments of the presently disclosed technology. For a period of time between two points (e.g., $t_i$ and $t_{i+k}$), an AR device 202 (e.g., corresponding to the AR device 102 of FIG. 1) may capture multiple images 220a, 220b, 220c, ..., 220d (e.g., consecutive video frames) that correspond to a user's real-world view at different time within the time period. The images can be captured by a camera 212 of the AR device 202 at different positions and/or orientations. The presently disclosed technology can examine each image (e.g., processing relevant pixels within the image) in real-time or substantially real-time as it is captured and identify 2D feature points (e.g., feature pixels) from the image. While 2D feature points are being identified, the presently disclosed technology can track respective 2D feature points across multiple images captured within a time window based on correlations between or among the multiple images. In some embodiments, the feature points extraction and tracking process does not require additional knowledge of the user's real-world view other than the two dimensional data captured by the images. In some embodiments, the feature points extraction and tracking process does not require extraction of any 2D plane within a 3D reference system based on the feature points.

Figure 3:
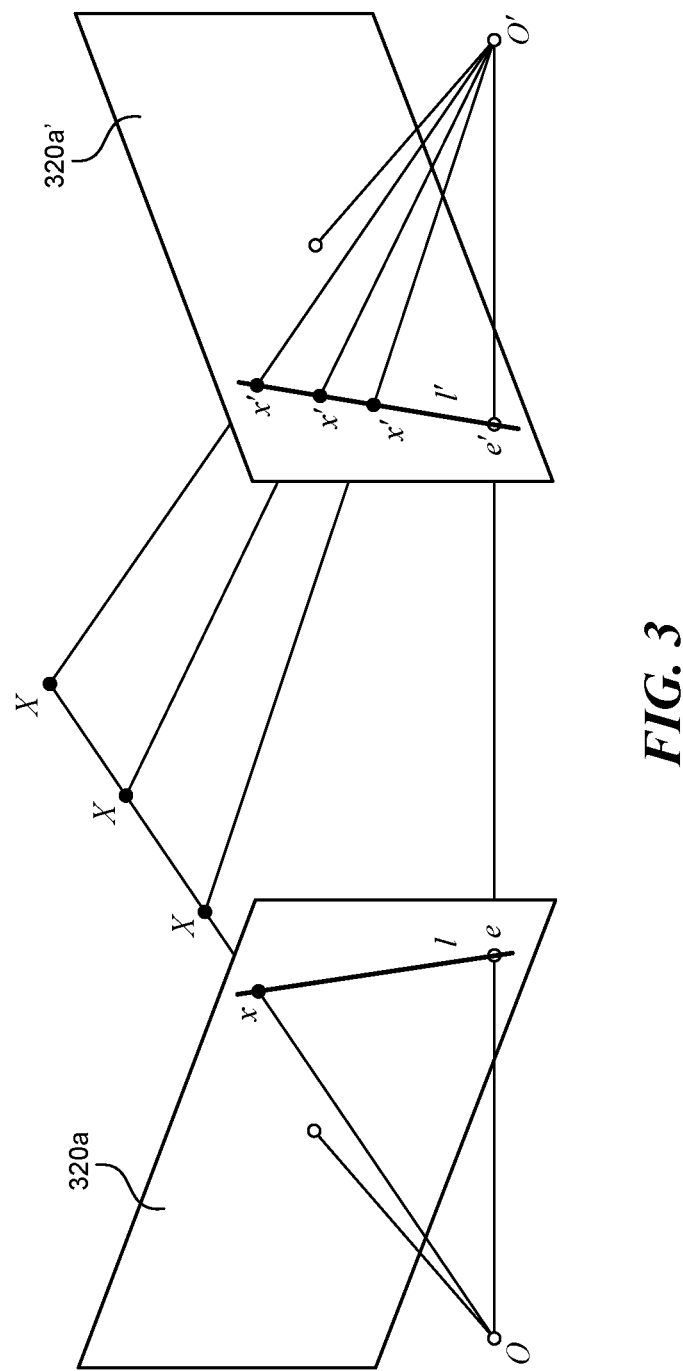
FIG. 3 illustrates an example of epipolar geometry based feature point tracking in accordance with some embodiments of the presently disclosed technology.

FIG. 3 illustrates an example of epipolar geometry based feature point tracking in accordance with some embodiments of the presently disclosed technology. FIG. 3 shows two images 320a and 320a' which are captured by a camera of an AR device at two different positions and/or orientations. O and O' represent the camera centers that correspond to the images 320a and 320a', respectively. The projection of O' on image 320a corresponds to an epipole point, e. Similarly, the projection of O on image 320a' corresponds to an epipole point, e'. In other words, epipoles are the points of intersection of a line through camera centers and the image planes.

For a 2D feature point x extracted from image 320a, determining its corresponding 3D point X in a real-world environment is infeasible without additional information, because every point on the line OX projects to the same point x on the image plane of image 320a. But different points on the line OX project to different points x' on the image plane of image 320a'.

The projection of the different points on OX form an epiline l' (corresponding to 2D feature point x) on the image plane of image 320a'. To efficiently track a 2D feature point x' on image 320a' that corresponds to the 2D feature point x on image 320a, the currently disclosed technology may examine pixels on the epiline l' (or within a threshold thereof) without processing other portions of the image 320a'. Therefore, any 2D feature points extracted on one image can possibly be tracked using their corresponding epilines on one or more other images. Such a tracking mechanism provides better computational performance and accuracy.

With feature points tracked across two or more images, the presently disclosed technology can triangulate the location of corresponding 3D feature points (e.g., point X) in a real-world environment and track the 3D feature points across multiple images as well.

Figure 4:
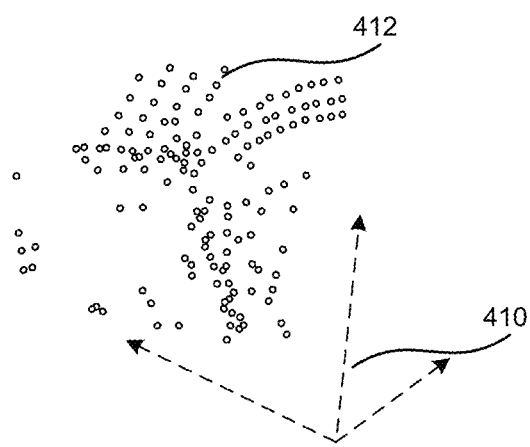
FIG. 4 illustrates an example of 3D point cloud generated in accordance with some embodiments of the presently disclosed technology.

FIG. 4 illustrates an example of 3D point cloud generated in accordance with some embodiments of the presently disclosed technology. As discussed above, the presently disclosed technology can extract and track 2D feature points from multiple images. The correlation of 2D feature points between images (e.g., based on epipolar geometry) can be used to determine relative rotations and/or translations between 2D reference systems (e.g., 2D coordinate system) of the respective images. Accordingly, the presently disclosed technology can transform 2D feature points extracted from multiple images (each associated with a respective 2D reference system) captured during a sliding time window into corresponding 2D feature points that reside within a 2D reference system associated with a target image (e.g., image captured at the beginning, mid-point, end, or other point within the sliding time window). These transformed 2D feature points can be combined with 2D feature points extracted from the target image itself to form a 2D point cloud.

The presently disclosed technology can convert the 2D point cloud into a 3D point cloud (e.g., 3D point cloud 412 as shown in FIG. 4) in a 3D reference system (e.g., 3D reference system 410) associated with the real-world environment or associated with the AR device or its camera. As discussed above, locations of 3D feature points that correspond to extracted 2D feature points can be determined, for example, based on triangulation. In some embodiments, the conversion from 2D point cloud to 3D point cloud can be implemented based on any other suitable technique known to those of skill in the art. For example, Perspective-n-Point (PnP) based methods can be used. In some embodiments, outliers of the feature points can be removed, for example, using bundle adjustment based methods.

Figure 5:
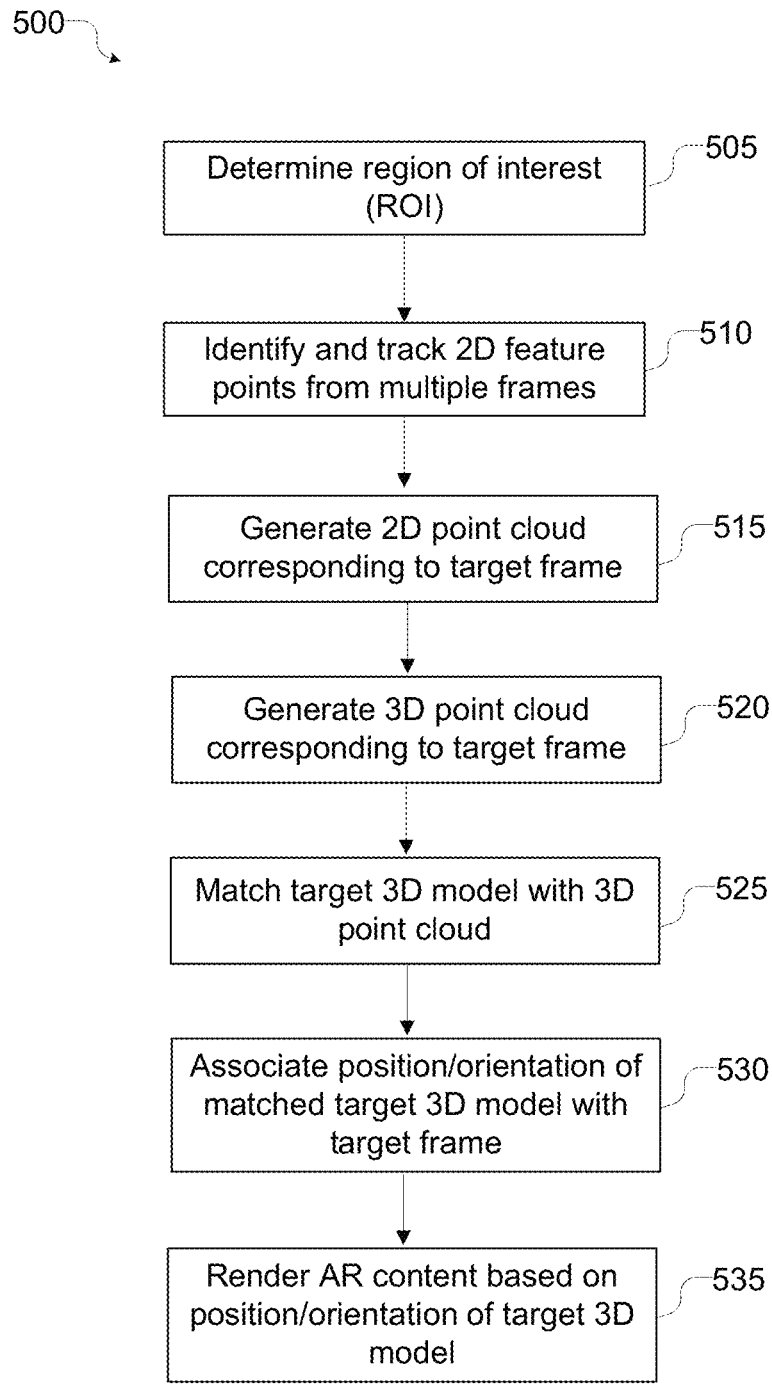
FIG. 5 is a flowchart illustrating a process for generating a 3D point cloud and matching with a target 3D model in accordance with some embodiments of the presently disclosed technology.

FIG. 5 is a flowchart illustrating a process 500 that can be implemented by the AR system 100 for generating a 3D point cloud and matching with a target 3D model in accordance with some embodiments of the presently disclosed technology. At block 505, the AR system 100 determines one or more regions of interest (ROI) for superimposing AR content. In some embodiments, the AR system 100 can present a user interface that enables a user to manually select one or more ROIs within a 2D image (e.g., outlining the ROI(s) on a touchable display of 2D image using finger touches and/or moves, selecting the ROI(s) via head-mount display of 2D image based on gaze and/or gesture recognition, or the like). In these embodiments, the AR system 100 can determine fixed locations and/or shapes of one or more ROIs relative to each frame (e.g., a fixed-size square that is always located at the center of each frame). In some embodiments, the AR system 100 can select ROI(s) based on automatic object detection within 2D images. For example, the AR system 100 can use suitable face detection methods to detect one or more regions that represent a human face within individual frames. In these embodiments, the AR system 100 can also estimate a measure of depth from the camera to the ROI(s) based on a comparison between the size of the detected object(s) in 2D image(s) and a known size of the object in the real world. Accordingly, 2D ROI determination can be performed regardless of movement of the AR device 102 or real world objects.

In some embodiments, the AR system 100 can enable a user to manually select one or more ROIs in a 3D reference system (3D coordinate system) associated with the AR device 102 (e.g., AR-HMD), for example, based on gaze and/or gesture recognition. In this regard, the AR system 100 can estimate camera motion once the AR system 100 has received and/or processed a sufficient amount of pose and map data. Given camera lens calibration data (e.g., provided by the AR device 102), the AR system 100 can estimate ROI(s) projected to any 2D frame using depth information of corresponding locations within the 3D reference system.

ROI determination does not have to be exact, because the presently disclosed technology includes functionalities designed to properly process "noise" and/or "outliers," In some embodiments, ROI determination is not performed, and the entire image, frame, and/or surrounding environment can be consider an ROI processed by the AR system 100 for superimposing AR content.

At block 510, the AR system 100 identifies and tracks 2D feature points from multiple frames. Illustratively, the AR system 100 can identify corners, edges, centroids, and/or other feature points within ROI(s) in each frame using suitable image processing methods known to those having skill in the art. As discussed above, 2D feature points can be tracked and correlated between or among frames using epipolar geometry based method(s), which is computationally more efficient than searching the entire image(s) for a feature point that can correlate to a corresponding feature point in another image. In some embodiments, the AR system 100 retrieves a pose estimation between two frames where feature points are to be tracked, and determines matching epilines (with or without a threshold proximity included) based on that estimation, and then refine the pose estimation based on feature points that are tracked between the two frames. In some embodiments, various sensor data can be collected from the AR device 102 to generate more accurate pose estimation in a more efficient manner. For example, the AR system 100 can implement suitable sensor fusion methods known to those of skill in the art.

At block 515, the AR system 100 generates 2D point cloud corresponding to a target frame. As discussed above, the correlation of 2D feature points between images (e.g., based on epipolar geometry) can be used to determine relative rotations and/or translations between 2D reference systems (e.g., 2D coordinate system) of the respective images. Accordingly, the AR system 100 can project the 2D feature points extracted from multiple images captured during a sliding time window onto a 2D reference system associated with a target image (e.g., a frame captured at the beginning, mid-point, end, or other point within the sliding time window) to form a 2D point cloud corresponding to the target frame. This process can include de-duplication, weighting, or other smoothing actions known to those of skill in the art to avoid double counting 2D feature points that correspond to a same 3D feature point in real world environment.

At block 520, the AR system 100 generates 3D point cloud corresponding to the target frame based at least in on the 2D point cloud. As discussed above, the AR system 100 can convert the 2D point cloud into a 3D point cloud in a 3D reference system (e.g., 3D coordinate system) associated with the real-world environment or associated with the AR device 102 or its camera. As discussed above, locations of 3D feature points that correspond to extracted 2D feature points can be determined, for example, based on triangulation. In some embodiments, the conversion from 2D point cloud to 3D point cloud can be implemented based on any other suitable technique known to those of skill in the art. For example, Perspective-n-Point (PnP) based methods can be used. In some embodiments, outliers of the feature points can be removed, for example, using bundle adjustment based methods.

At block 525, the AR system 100 matches one or more target 3D models with the 3D point cloud. Illustratively, the AR system 100 selects the target 3D model(s) from the model data service 106. The target 3D models can include, for example, a 3D mesh or point cloud model of a real-world object such as a human face, head, brain, or the like that has been pre-generated based on existing data, measurements, or design. In some embodiments, the AR system 100 converts the target 3D model into a simplified model point cloud with occlusion, that is, the AR system 100 determines which 3D points (e.g., corners, edges, centroids, or the like) included in or derived from the target 3D model would have been visible to the camera and/or may be detected as a feature point in a frame captured by the camera. The AR system 100 can then match the simplified model point cloud with the 3D point cloud generated at block 520 based, for example, on Iterative Closest Point (ICP) methods or other suitable methods know to those of skill in the art.

At block 530, the AR system 100 associates (1) the position and/or orientation of the matched target 3D model(s) with (2) the target frame. Illustratively, the matching process of block 525 determines the position and/or orientation of the target 3D model(s) so as to align with the 3D point cloud that corresponds to the target frame. The AR system 100 can record the position and/or orientation information and associate it (e.g., using pointers, address reference, and/or additional data fields of same data record) with the target frame (e.g., image data and/or 2D feature points extracted from the target frame). Such a record of association can be stored, indexed, and/or otherwise maintained by the association data service 108 for efficient search and retrieval.

At block 535, the AR system 100 renders AR content based on the position and/or orientation of the matched target 3D model. Illustratively, the target frame corresponds to a frame recently captured by a camera of the AR device 102. Using the position and/or orientation of the matched target 3D model as a basis, the AR system 100 can compute an estimated position and/or orientation of the target 3D model to properly project or overlay AR content onto a current view of the user. In this regard, the estimation can be based on movement and/or rotation, in one or multiple dimensions, of the AR device 102 between the target frame and the current user view.

In some embodiments, the AR system 100 can use one or multiple types of data collected within a recent period of time (e.g., feature point tracking data, GPS data, IMU data, LiDAR data, or the like that can be provided by the AR device 102) to determine the movement and/or rotation. Given the estimated position and/or orientation of the target 3D model, the AR system 100 can render AR content based thereon and project or overlay AR content to align with a corresponding real world object within the user's current view.

Figure 6:
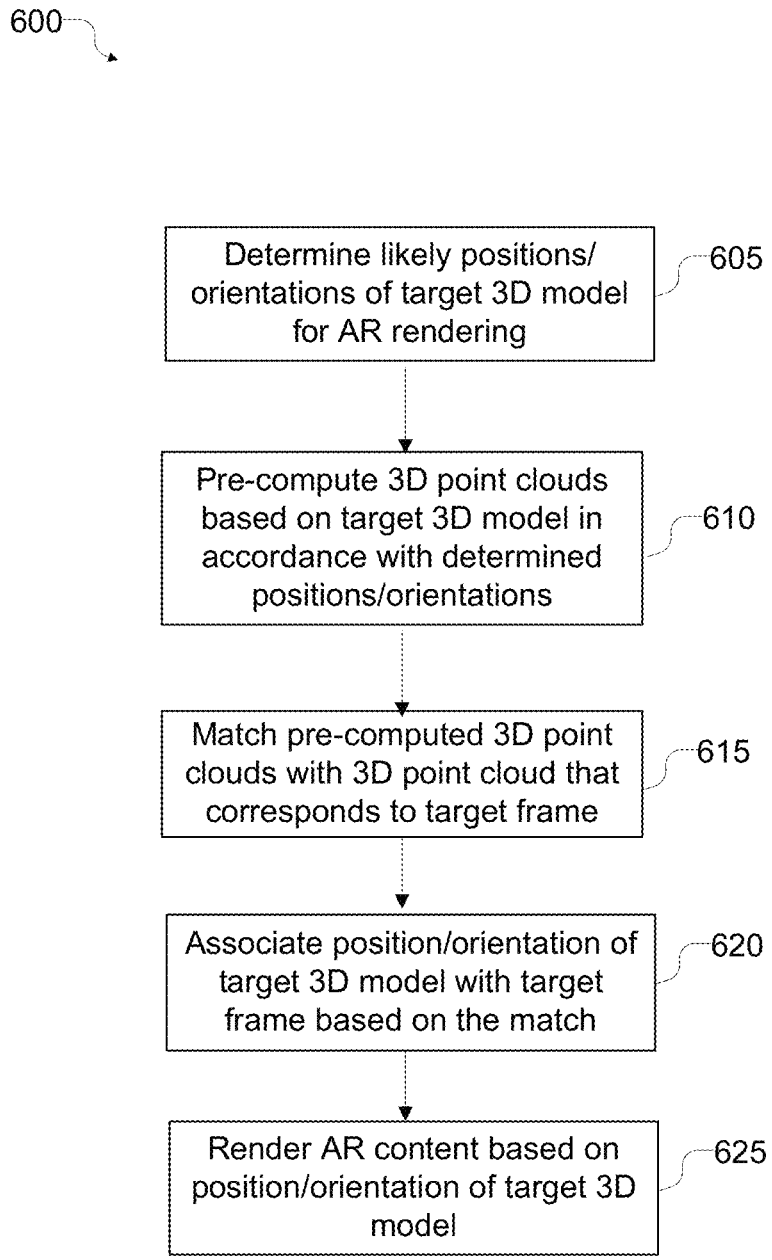
FIG. 6 is a flowchart illustrating a process for pre-computing and matching of 3D point clouds based on likely positions and/or orientation of a target 3D model in accordance with some embodiments of the presently disclosed technology.

FIG. 6 is a flowchart illustrating a process 600 that can be implemented by the AR system 100 for pre-computing and matching of 3D point clouds based on likely positions and/or orientations of a target 3D model in accordance with some embodiments of the presently disclosed technology. Process 600 can be implemented in combination, in parallel, or in sequence with the implementation of process 500. At block 605, the AR system 100 determines likely positions and/or orientations of a selected target 3D model for AR content rendering. Illustratively, for a target 3D model selected from the model data service 106, the AR system 100 can randomly generate a number of positions and/or orientations within a threshold proximity of a base position and/or orientation. In some embodiments, the base position and/or orientation can correspond to a position and/or orientation of the target 3D model that matches a 3D point cloud generated based on one or more recent frames. For example, the base position and/or orientation can be selected from the associations that have been added or updated with the association data service within a recent period of time. In some embodiments, the AR system 100 can determine likely positions and/or orientations of the selected target 3D model based on user input, historical statistics, positions and/or orientations of an associated 3D model for other AR content rendering, or the like.

At block 610, the AR system 100 pre-computes 3D point clouds based on the target 3D model in accordance with the determined likely positions and/or orientations. Illustratively, the AR system 100 converts the target 3D model into a simplified model point cloud with occlusion, that is, the AR system 100 determines which 3D points included in or derived from the target 3D model would have been visible to the camera and/or may be detected as a feature point in a frame captured by the camera. The AR system 100 can compute mathematical transformations (e.g., translation and/or rotation) between 3D reference systems of (1) the base position and/or orientation and (2) each likely positions and/or orientations. The AR system 100 can apply the mathematical transformations to the simplified model point cloud to obtain the pre-computed 3D point clouds that correspond to the target 3D model at various likely positions and/or orientations. In some embodiments, the AR system 100 can convert individual pre-computed 3D point clouds into one or more corresponding pre-computed 2D point clouds in accordance based on likely positions and/or orientation (e.g., a centered frontal orientation) of the AR device or camera.

At block 615, the AR system 100 matches the pre-computed 3D point clouds with a 3D point cloud that corresponds to a target frame. As discussed above with respect to blocks 515 and 520 of the process 500, the AR system 100 can generate a 3D point cloud corresponding to a target frame based at least in on a 2D point cloud. The AR system 100 can compare multiple pre-computed 3D point clouds with the 3D point cloud that corresponds to the target frame. The comparison can be achieved by calculating a comparative difference measure, such as an average pairwise difference between nearest points in a pre-computed 3D point cloud and the 3D point cloud corresponding to the target frame. The AR system 100 can select one or more pre-computed 3D point clouds associated with the least comparative difference(s) as matching the 3D point cloud corresponding to the target frame after ordering or sorting the comparative differences. The comparison and matching can be computationally cheap and efficient because they do not need to include an optimization process (e.g., iterative gradient descent based methods). In the embodiments where the pre-computed 3D point clouds have been converted into corresponding pre-computed 2D point clouds, the AR system 100 can alternatively match the pre-computed 2D point clouds with a 2D point cloud that corresponds to a target frame, which can be computationally more efficient.

At block 620, the AR system 100 associates the position and/or orientation of the target 3D model with the target frame based on the match of block 615. Illustratively, the AR system can record the position(s) and/or orientation(s) associated with the matching pre-computed 3D point cloud(s) as selected at block 615, and associate the recorded position(s) and/or orientation(s) with the target frame (or its 20 feature points). As discussed above, the AR system 100 can store the association with the association data service 108 for future search, retrieval, and/or other uses.

At block 625, the AR system 100 renders AR content based on the position and/or orientation of the target 3D model. As discussed above with respect to block 535 of the process 500, illustratively, the target frame can correspond to a frame recently captured by a camera of the AR device 102. Using the target 3D model position and/or orientation recorded at block 620, the AR system 100 can compute an estimated position and/or orientation of the target 3D model to properly project or overlay AR content onto a current view of the user. In this regard, the estimation can be based on movement and/or rotation, in one or multiple dimensions, of the AR device 102 between the target frame and the current user view.

In some embodiments, the AR system 100 can use one or multiple types of data collected within a recent period of time (e.g., feature point tracking data, GPS data, IMU data, LiDAR data, or the like that can be provided by the AR device 102) to determine the movement and/or rotation. Given the estimated position and/or orientation of the target 3D model, the AR system 100 can render AR content based thereon and project or overlay AR content to align with a corresponding real world object within the user's current view.

In other embodiments, the target frame can correspond to a frame reflecting the current view of the user. In these embodiments, the AR system 100 does not need to calculate additional estimated position and/or orientation of the target 3D model, but can use the position and/or orientation recorded at block 620 for AR content rendering. These embodiments can be achieved, for example, due to the computational efficiency of the comparison and matching process of block 615.

Figure 7:
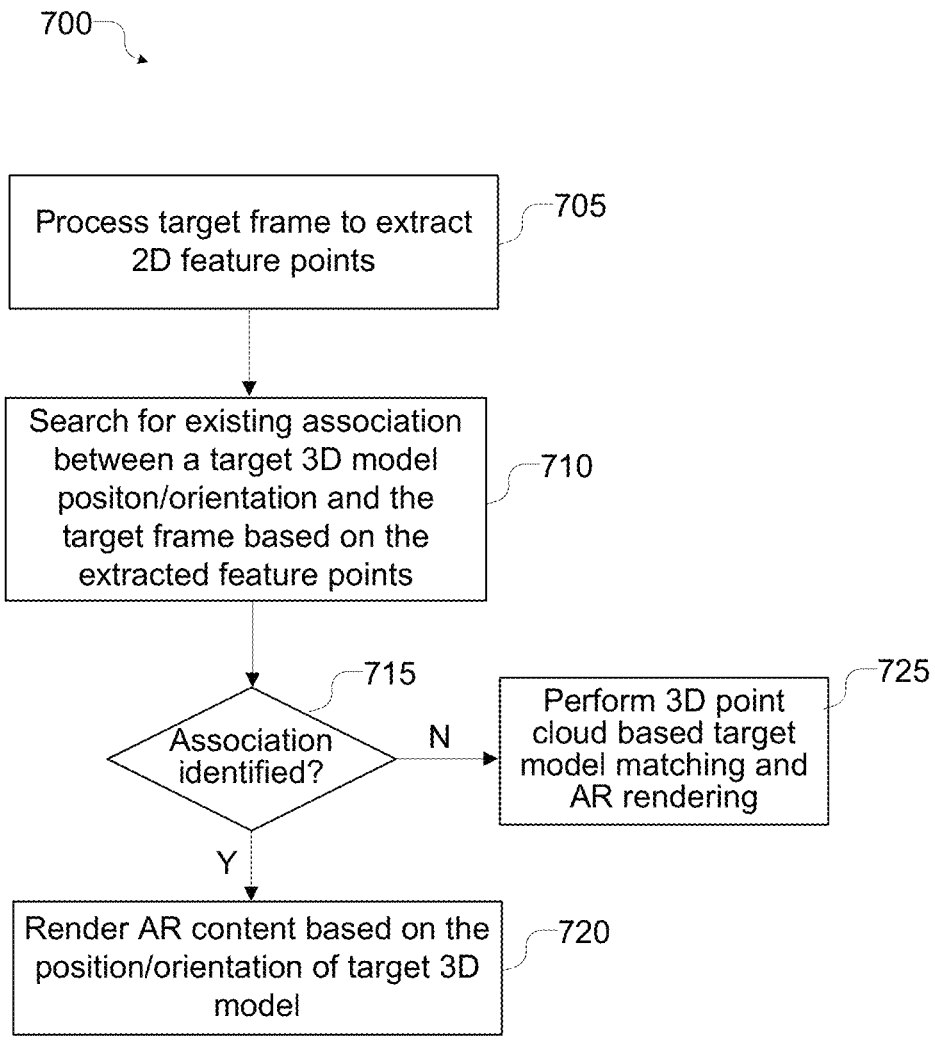
FIG. 7 is a flowchart illustrating a process for identifying an existing association between a target 3D model and 2D feature points of a target frame in accordance with some embodiments of the presently disclosed technology.

FIG. 7 is a flowchart illustrating a process 700 that can be implemented by the AR system 100 for identifying an existing association between a target 3D model and 2D feature points of a target frame in accordance with some embodiments of the presently disclosed technology. Process 700 can be implemented in combination, in parallel, or in sequence with the implementation of process 500 and/or process 600. At block 705, the AR system 100 processes a target frame to extract 2D feature points. In some embodiments, the AR system extracts a limited number of 2D feature points to ensure real-time execution of the process 700.

At block 710, the AR system 100 searches for an existing association between the position and/or orientation of a target 3D model and the target frame based at least in part on the extracted 2D feature points. Illustratively, the AR system 100 can search the association records maintained by the association data service 108 to identify a recorded set of 2D feature points that best matches (e.g. with the least matching error) the currently extracted 2D feature points. In some embodiments, multiple sets of matching 2D feature points can be identified. For example, the matching error for each set of the matching 2D feature points is below an acceptance threshold. In some embodiments, the search for existing association(s) can be based on a match between the target frame itself (e.g., 2D image data) and the image data maintained within association records of the association data service 108.

At block 715, the AR system 100 determines whether one or more exiting associations are identified. If so, the process 700 proceeds to block 720 where the AR system 100 renders AR content based at least in part on the identified position and/or orientation of the target 3D model. In embodiments where a single association is identified, the AR system 100 can use the position and/or orientation of the target 3D model associated with the matching set of 2D feature points for AR content rendering. In embodiments where multiple associations are identified, the AR system 100 can use all their associated model positions and/or orientations by, for example, calculating a weighted average position and/or orientation of the target 3D model. In some embodiments, the AR content rendering at block 720 can be performed in a similar manner as block 535 of process 500.

In some embodiments, the target frame can correspond to a current user view and the AR system 100 does not need to compute another estimated position and/or orientation of the target 3D model for projecting AR content. In these embodiments, the AR system 100 can project AR content using the position and/or orientation obtained from the identified association(s). These embodiments can be enabled, at least in part, due to the relatively short processing time of the association identification process, which does not involve the computationally more expensive 2D and/or 3D point cloud generation and matching.

Referring back to block 715, if the AR system 100 fails to identify one or more existing associations, the process 700 proceeds to block 725 where the AR system 100 performs 3D point cloud based target model matching and AR rendering, for example, in accordance with process 600 and/or process 700 as discussed above.

Figure 8:
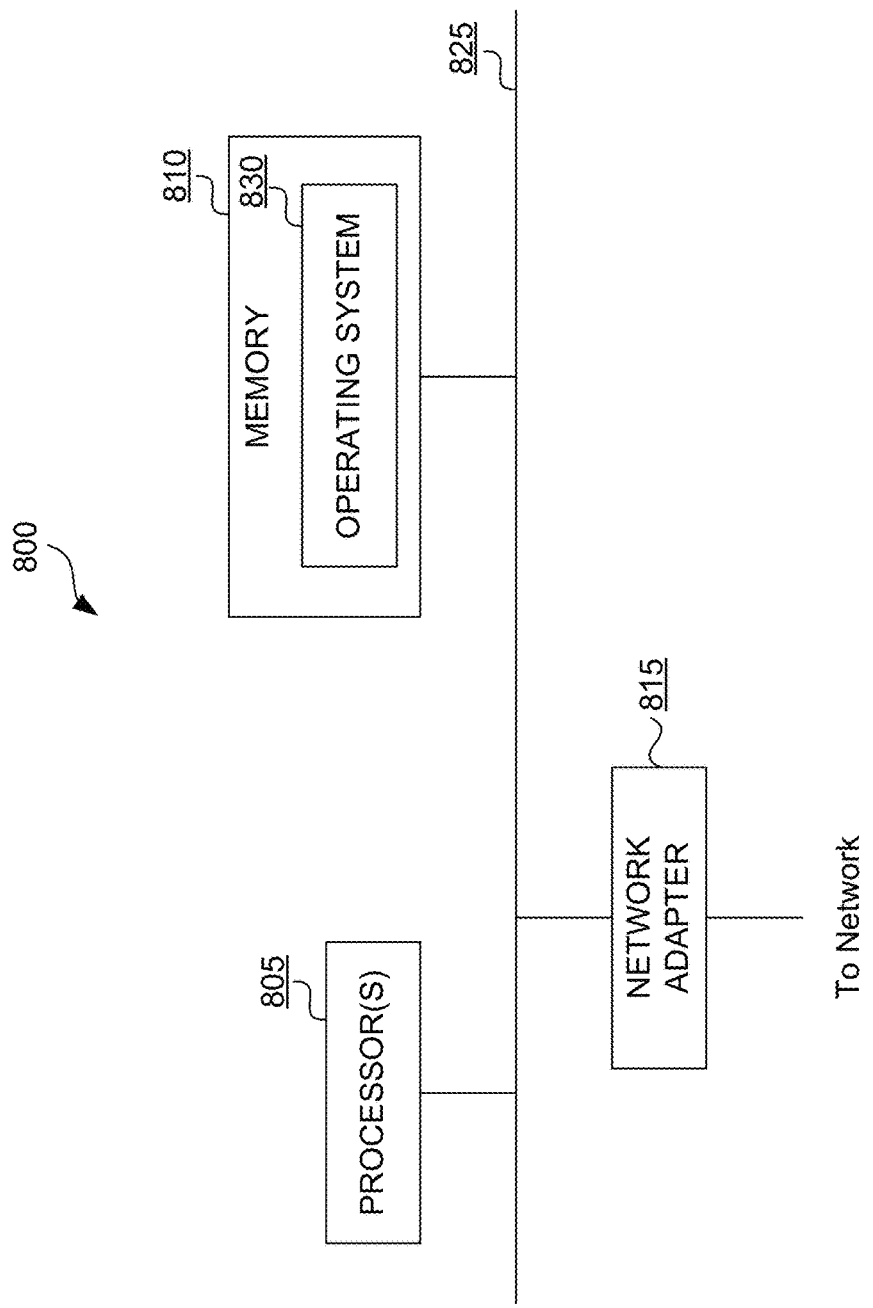
FIG. 8 is a block diagram illustrating an example of the architecture for a computer system (or computing device) that can be utilized to implement various portions of the presently disclosed technology.

FIG. 8 is a block diagram illustrating an example of the architecture for a computer system (or computing device) 800 that can be utilized to implement various portions of the presently disclosed technology. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire".

The processor(s) 805 may include central processing units (CPUs) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), graphics processing unit (GPU), mobile application processors, microcontrollers, application specific integrated circuits (ASICs), programmable gate arrays (PGAs), programmable controllers, programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement various embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter. Additionally and optionally, transparent display device, depth camera or sensor, head tracking camera, video camera, other sensors, communication device, audio device, or the like can be connected to the processor(s) 805 (directly or indirectly) through the interconnect 825.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A computer-implemented method, comprising:
identifying a three-dimensional model of an object, the three-dimensional model being for rendering augmented reality (AR) content;
generating, at an initialization time, a plurality of pre-computed three-dimensional point clouds of the three-dimensional model based, at least in part, on a plurality of likely positions and/or orientations of the three-dimensional model, wherein each pre-computed three-dimensional point cloud of the plurality of pre-computed three-dimensional point clouds corresponds to a distinct likely position and/or orientation of the three-dimensional model of the plurality of likely positions and/or orientations;
capturing a first image of a user's view at a first point in time subsequent to the initialization time;
selecting one of the pre-computed three-dimensional point clouds that matches a target three-dimensional point cloud that corresponds to a position of the object in the first image; and
rendering the AR content based, at least in part, on the likely position and/or orientation of the three-dimensional model that corresponds to the selected pre-computed three-dimensional point cloud.

2. The method of claim 1, wherein generating the plurality of pre-computed three-dimensional point clouds comprises determining the plurality of likely positions and/or orientations of the three-dimensional model based, at least in part, on a base position and/or orientation.

3. The method of claim 2, wherein the base position and/or orientation is determined based, at least in part, on one or more second images capturing the user's view at one or more second points in time.

4. The method of claim 3, wherein the one or more second points in time precede the first point in time.

5. The method of claim 2, wherein determining the plurality of pre-computed three-dimensional point clouds comprises randomly generating the plurality of precomputed three dimensional point clouds within a proximity of the base position and/or orientation.

6. The method of claim 1, further comprising generating and maintaining an association between an indication of the first image and the likely position and/or orientation of the three-dimensional model that corresponds to the selected pre-computed three-dimensional point cloud.

7. The method of claim 6, wherein the indication of the first image includes a plurality of two-dimensional feature points detected from the first image.

8. The method of claim 7, wherein the two-dimensional feature points include at least one of detected corners, edges, or centroids of objects within the first image.

9. The method of claim 1, wherein respective user's views captured by the first and the one or more second images differ, at least in some portions, due to rotational and/or translational motion of the user.

10. The method of claim 1, wherein generating the plurality of pre-computed three-dimensional point clouds comprises, for each respective pre-computed three-dimensional point cloud of the plurality of pre-computed three-dimensional point clouds:
    determining a base position and/or orientation of the three-dimensional model; and
    applying at least one of a transformation and a rotation to the base position to obtain the respective pre-computed three-dimensional point cloud.

11. A non-transitory computer-readable medium storing computer-executable instructions that, when executed by one or more processors, cause the one or more processors to perform operations, the operations comprising:
    identifying a three-dimensional model of an object within a user's view, the three-dimensional model being for rendering augmented reality (AR) content;
    generating, at an initialization time, a plurality of pre-computed point clouds of the three-dimensional model based, at least in part, on a plurality of likely positions and/or orientations of the three-dimensional model, wherein each pre-computed point cloud of the plurality of pre-computed point clouds corresponds to a likely position and/or orientation of the three-dimensional model of the plurality of likely positions and/or orientations;
    capturing a first image of the user's view at a first point in time subsequent to the initialization time;
    selecting a pre-computed point cloud that matches a target point cloud that corresponds to a first image of a user's view captured by an AR device at a first point in time; and
    rendering the AR content based, at least in part, on the likely position and/or orientation of the three-dimensional model that corresponds to a position of the object in the first image.

12. The computer-readable medium of claim 11, wherein the pre-computed point clouds are three-dimensional or two-dimensional.

13. The computer-readable medium of claim 11, wherein the selected precomputed point cloud has a least comparative difference with the target point cloud among the plurality of pre-computed point clouds.

14. The computer-readable medium of claim 11, wherein the AR device includes a head-mount device.

15. The computer-readable medium of claim 11, wherein generating the plurality of pre-computed point clouds comprises, for each respective pre-computed point cloud of the plurality of pre-computed point clouds:
    determining a base position and/or orientation of the three-dimensional model; and
    applying at least one of a transformation and a rotation to the base position to obtain the respective pre-computed point cloud.

16. A system, comprising:
    one or more processors;
    a memory configured to store a set of instructions, which when executed by the one or more processors cause the system to:
    identify a three-dimensional model of an object within a user's view, the three-dimensional model being for rendering augmented reality (AR) content;
    generate, at an initialization time, a plurality of pre-computed point clouds of the three-dimensional model based, at least in part, on a plurality of likely positions and/or orientations of the three-dimensional model, wherein each pre-computed point cloud of the plurality of pre-computed point clouds corresponds to a likely position and/or orientation of the three-dimensional model of the plurality of likely positions and/or orientations;
    capture a first image of the user's view at a first point in time subsequent to the initialization time;
    select one or more pre-computed point clouds that match a target point cloud that corresponds to a position of the object in the first image; and
    render the AR content based, at least in part, on one or more likely positions and/or orientations of the three-dimensional model that each corresponds to the selected one or more pre-computed point clouds.

17. The system of claim 16, wherein generating the plurality of pre-computed point clouds is further based on at least one of user input, historical statistics, positions and/or orientations of an associated three-dimensional model.

18. The system of claim 16, wherein the set of instructions, which when executed by the one or more processors further cause the system to determine an estimated positional change between the target point in time and a present time.

19. The system of claim 18, wherein rendering AR content is further based, at least in part, on the estimated positional change.

20. The system of claim 16, wherein generating the plurality of pre-computed point clouds comprises, for each respective pre-computed point cloud of the plurality of pre-computed point clouds:
    determining a base position and/or orientation of the three-dimensional model; and
    applying at least one of a transformation and a rotation to the base position to obtain the respective pre-computed point cloud.

* * * * *